United States Patent
Gruszecki et al.

(10) Patent No.: US 10,884,998 B2
(45) Date of Patent: Jan. 5, 2021

(54) METHOD FOR MIGRATING DATA RECORDS FROM A SOURCE DATABASE TO A TARGET DATABASE

(71) Applicant: INTERNATIONAL BUSINESS MACHINES CORPORATION, Armonk, NY (US)

(72) Inventors: Artur M. Gruszecki, Cracow (PL); Tomasz Sekman, Cracow (PL); Tomasz Kazalski, Balice (PL); Andrzej J. Wrobel, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 293 days.

(21) Appl. No.: 16/131,101

(22) Filed: Sep. 14, 2018

(65) Prior Publication Data

US 2020/0089776 A1 Mar. 19, 2020

(51) Int. Cl.
*G06F 16/27* (2019.01)
*G06F 16/21* (2019.01)
*G06F 17/14* (2006.01)
*G06F 9/54* (2006.01)

(52) U.S. Cl.
CPC ............ *G06F 16/214* (2019.01); *G06F 9/544* (2013.01); *G06F 16/27* (2019.01); *G06F 17/14* (2013.01)

(58) Field of Classification Search
CPC ........ G06F 16/214; G06F 16/27; G06F 17/14; G06F 9/544; G06F 16/256; G06F 16/254; G06F 16/90348
See application file for complete search history.

(56) References Cited

U.S. PATENT DOCUMENTS 5,794,240 A * 8/1998 Yamashita ................ G06F 7/22
                                                    707/752
6,567,823 B1 * 5/2003 Rothschild ............ G06F 16/214
8,370,844 B2    2/2013 Archer et al.
(Continued)

OTHER PUBLICATIONS

Ramos, "AWS Schema Conversion Tool: General Approach to Migration of Data Warehouses to Amazon Redshift", DB Best Chronicles talks on Managing Data and Applications Anywhere, Dec. 6, 2016, https://www.dbbest.com/blog/aws-sche,a-conversion-tool-general-approach-teradata-oracle-redshift-migration/.
(Continued)

*Primary Examiner* — Mohammed R Uddin
(74) *Attorney, Agent, or Firm* — Reza Sarbakhsh

(57) ABSTRACT

The present disclosure relates to a method using a database engine for migrating data records from a source database to a target database, where said data records are arranged in a sorted source table of the source database in accordance with a clustered-base-table order following the Hilbert-Filling-Curve algorithm. The method comprises configuring the database engine for storing the CBT order of each data record of the source table in a reference table to said source table or a in a column of said source table. A reading step may be performed to read said data records from said source table, wherein in said reading step said stored CBT order is used. The read data and the stored CBT order may be transferred to the target database in accordance with the stored CBT order. The transferred data may be written at the target database in accordance with the CBT order.

20 Claims, 8 Drawing Sheets

(56) References Cited

U.S. PATENT DOCUMENTS

| | | | |
|---|---|---|---|
| 8,719,540 B1* | 5/2014 | Miller | G06F 3/0665 |
| | | | 711/173 |
| 8,799,284 B2 | 8/2014 | Jagtiani et al. | |
| 9,430,505 B2 | 8/2016 | Padmanabhan et al. | |
| 9,785,645 B1 | 10/2017 | Chen et al. | |
| 9,792,185 B2 | 10/2017 | Gaza et al. | |
| 10,114,846 B1* | 10/2018 | Shah | G06F 16/90348 |
| 10,657,154 B1* | 5/2020 | Dugar | G06F 16/214 |
| 2008/0154934 A1* | 6/2008 | Lau | G06F 16/24552 |
| 2008/0281791 A1* | 11/2008 | Ito | G06F 16/284 |
| 2011/0081017 A1* | 4/2011 | Matsushima | H04L 9/0836 |
| | | | 380/45 |
| 2012/0131265 A1* | 5/2012 | Koltsidas | G06F 12/0897 |
| | | | 711/103 |
| 2014/0095502 A1* | 4/2014 | Ziauddin | G06F 16/21 |
| | | | 707/737 |
| 2017/0078137 A1* | 3/2017 | Spiegl | G06F 11/3495 |

OTHER PUBLICATIONS

Furlong, "Options to Scale Your SQL Server Data Warehouse", Bluegranite Resources, Business Insights, Dec. 6, 2016, https://www.blue-granite.com/blog/options-to-scale-your-sql-server-data-warehouse.

* cited by examiner

US 10,884,998 B2

METHOD FOR MIGRATING DATA RECORDS FROM A SOURCE DATABASE TO A TARGET DATABASE

BACKGROUND

The present invention relates to the field of digital computer systems, and more specifically, to a method using a database engine for migrating data records from a source database to a target database.

SUMMARY

Various embodiments provide a method using a database engine for migrating data records from a source database to a target database, computer system and computer program product as described by the subject matter of the independent claims. Advantageous embodiments are described in the dependent claims. Embodiments of the present invention can be freely combined with each other if they are not mutually exclusive.

In one aspect, the invention relates to a method using a database engine for migrating data records from a source database to a target database, where said data records are arranged in a sorted source table of the source database in accordance with a clustered-base-table order ("CBT order") following the Hilbert-Filling-Curve algorithm. The method comprises: configuring the database engine for storing the CBT order of each data record of the source table in a reference table to said source table or a in a column of said source table; performing a reading step to read said data records from said source table, wherein in said reading step said stored CBT order is used; transferring the read data records and the stored CBT order to the target database in accordance with the stored CBT order; and writing at the target database the transferred data to said target table in accordance with the CBT order using the stored CBT order.

In another aspect, the invention relates to a computer program product comprising a computer-readable storage medium having computer-readable program code embodied therewith, the computer-readable program code configured to implement all of steps of the method according to preceding embodiments.

In another aspect, the invention relates to a computer system for migrating data records from a source database to a target database, where said data records are arranged in a sorted source table of the source database in accordance with a clustered-base-table order ("CBT order") following the Hilbert-Filling-Curve algorithm. The computer system is configured for: storing the CBT order of each data record of the source table in a reference table to said source table or a in a column of said source table; performing a reading step to read said data records from said source table, wherein in said reading step said stored CBT order is used; transferring the read data records and the stored CBT order to the target database in accordance with the stored CBT order; and writing at the target database the transferred data to said target table in accordance with the CBT order using the stored CBT order. The computer system may for example be part of a database engine.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

In the following embodiments of the invention are explained in greater detail, by way of example only, making reference to the drawings in which.

DETAILED DESCRIPTION

Figure 1:
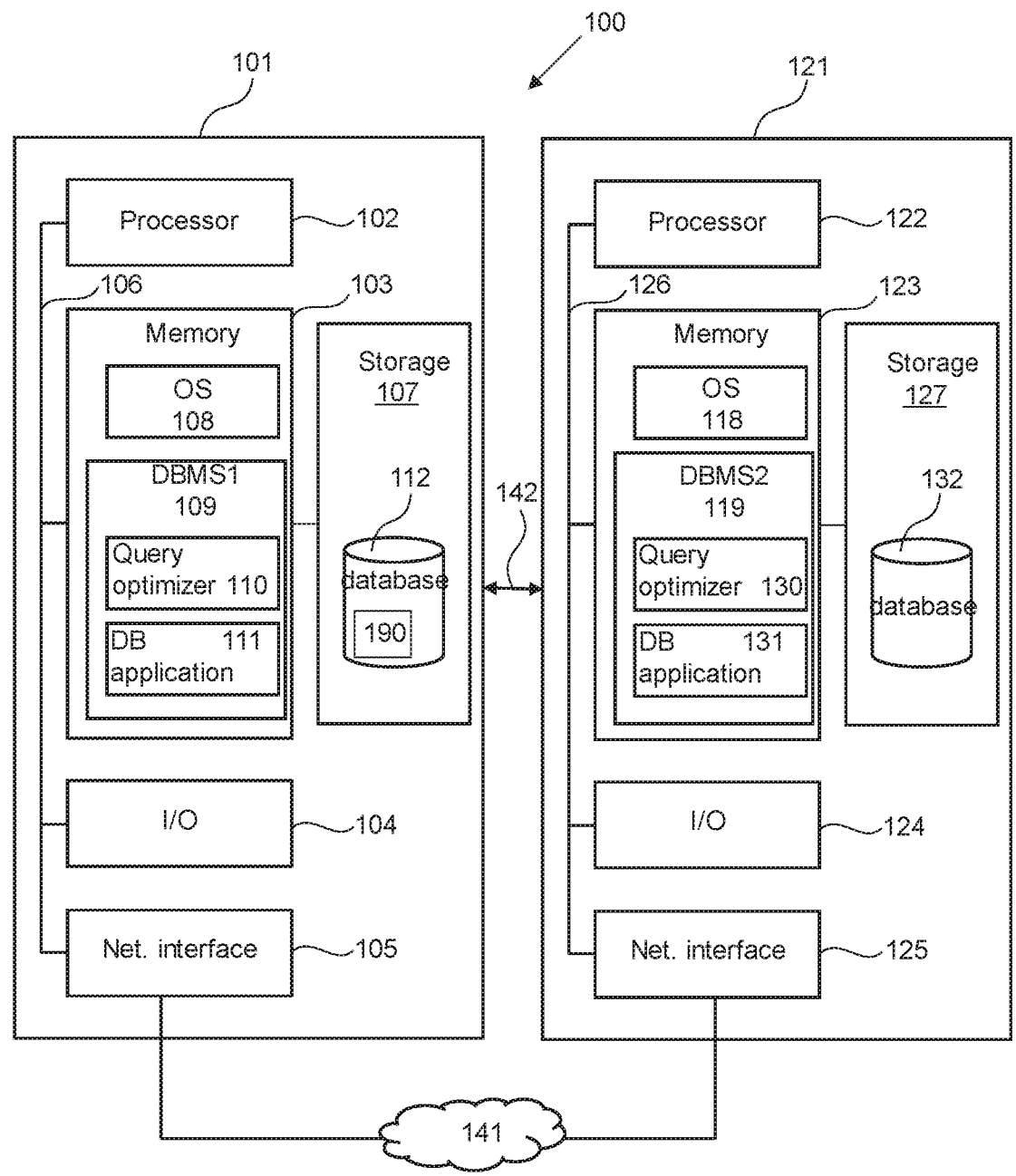
FIG. 1 depicts a data processing system according to an example of the present disclosure.

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

One of the typical problems during migration of the data from one database to another is the change of a physical order of the data. It may become more problematic when dealing with massively parallel processing (MPP) databases as the source data is organized by Clustered Base Tables (CBT) methods. In such case, after migration, the data are spread differently. This may reduce the performance of the target database compared the source database.

The CBT order is an order that results from applying the Hilbert-Filling-Curve algorithm to order the records of the source table. The CBT order is the physical order in which the records are stored in extents. The term "CBT order" is used for naming purpose to indicate that the ordered records that result from the Hilbert-Filling-Curve algorithm may be clustered and stored in nearby extents in accordance with the CBT algorithm. But, it is not limited to that way of storage and other ways of storing the ordered records may be used with the present disclosure.

The present method may enable consistency in data content between the source and the target databases by maintaining a consistent ordering of data records in the source and target databases. After migration, the data is maintained in the same CBT order and thus the performance of the target database can be similar to the performance of the source database.

The term "data table" or "table" as used herein refers to a collection of data that may be presented in a tabular form. Each column in the data table may represent a particular variable or attribute. Each row in the data table may represent a given member, record (or data record) or entry of the data table.

According to one embodiment, transferring the data records is performed using one or more threads. Using the threads may provide concurrency within a process and may allow utilization of multiprocessor architectures to a greater scale and efficiency.

According to one embodiment, the method further comprises splitting the data records into chunks of consecutive subsets of ordered data records, wherein each thread is configured to transfer a respective subset of the data records. For example, assuming that the source table comprises records r1 to r6. The CBT ordering following the Hilbert-Filling-Curve algorithm may result in this order of the records: r2→r4→r6→r5→r3→r1. In this case, two chunks may for example be created, one chunk having records r2→r4→r6 and the second subsequent chunk comprises r5→r3→r1. One thread may be used to process the first subset of records r2→r4→r6 and another thread may be used for processing the other subset of records r5→r3→r1. This may enable an efficient processing of records in accordance with the CBT order.

According to one embodiment, the method further comprises determining a storage order in which the data records are stored by the threads in the target database, wherein the reading step further comprises: in case the storage order is different from the CBT order applying an operation to order the data records in accordance with the storage order such that the writing of the data records can be performed in accordance with the CBT order. For example, with a conventional method, the records on the target side may be stored as they arrive at the target side e.g. if record r3 arrives at the target side before r6, r3 may be stored before storing r6 so that r3 is ordered before r6. However, this order is different from the CBT order e.g. where r3 is ordered after r6. On the target side one may thus not benefit from the CBT order. This embodiment may solve this problem by taking into account the storage order.

According to one embodiment, the applying of the operation to order the data records comprises applying a modulo operation to perform the ordering of the data records. The modulo operation may be advantageous as it may enable to make use of existing database management tools. The modulo operation may for example be implemented using a SQL MOD( ) function.

According to one embodiment, the method further comprises providing a first named pipe and second named pipe, wherein the result of said reading step is placed or stored in the first named pipe, wherein the second named pipe is configured for storing said data records after being transferred to a target system of the target database. The target system comprises the target database. The method further comprises buffering and synchronizing said data for the writing. A named pipe (or a pipe) may, for example, be a section of a memory that is used for communication. A named pipe may be configured to operate as a first in, first out (FIFO) memory such that the inputs that enter first will be read or output first.

According to one embodiment, the buffering and synchronizing comprises: a) buffering in a buffer a current received subset of records of a given thread; and b) in case the data records of the current received subset are the first ordered data records of the source table, storing the first subset and any subsequent stored subset of records in the buffer; otherwise waiting for another subset of records of another thread and repeating steps a) and b) for the other received subsets until all subsets are received. Following the above example, if the subset r5→r3→r1 arrives at the target side before the subset r2→r4→r6, the subset r5→r3→r1 may be buffered and the system may wait until it receives the subset r2→r4→r6. Once the subset r2→r4→r6 is received it may be determined that the two subsets are subsequent to each other and that are the first ordered ones and thus may be stored in accordance with the CBT order.

According to one embodiment, the storing of the CBT order comprises storing the CBT order in a hidden column. This may provide an implementation that is transparent to the user. For example, the user may not realize that there is any additional column. This embodiment may seamlessly be integrated in existing systems.

FIG. 1 is a block diagram for a data processing system 100 for a database engine (e.g. such as a hybrid DBMS) suited for implementing method steps as involved in the disclosure. The data processing system 100 comprises a first computer system 101 connected to a second computer system 121.

First computer system 101 includes processor 102, memory 103, I/O circuitry 104 and network interface 105 coupled together by bus 106.

Processor 102 may represent one or more processors (e.g. microprocessors). The memory 103 can include any one or combination of a volatile memory element (e.g., random access memory (RAM)), nonvolatile memory element (e.g., ROM), erasable programmable read only memory (EPROM), electronically erasable programmable read only memory (EEPROM), and programmable read only memory (PROM). Note that the memory 103 can have a distributed architecture, where various components are situated remote from one another, but can be accessed by the processor 102.

Memory 103 in combination with persistent storage device 107 may be used for local data and instruction storage. Storage device 107 includes one or more persistent storage devices and media controlled by I/O circuitry 104. Storage device 107 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like.

Figure 2:
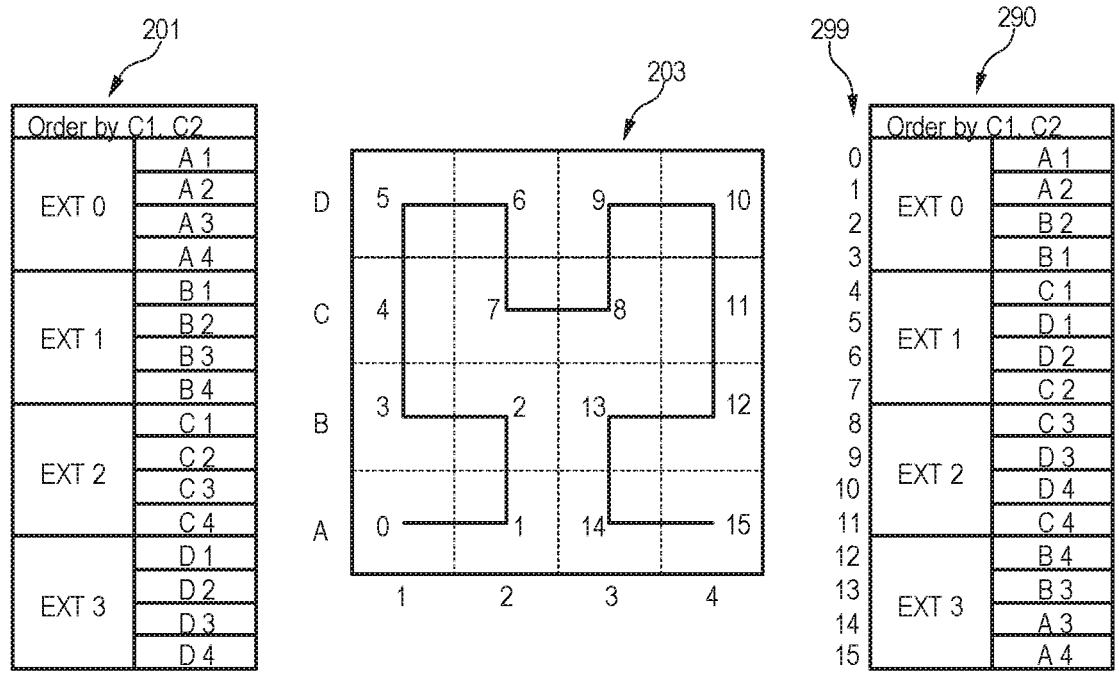
FIG. 2 depicts examples content of the source data table.

Memory 103 may include one or more separate programs e.g. database management system DBMS1 109, each of which comprises an ordered listing of executable instructions for implementing logical functions, notably functions involved in embodiments of this invention. The software in memory 103 shall also typically include a suitable operating system (OS) 108. The OS 108 essentially controls the execution of other computer programs for implementing at least part of methods as described herein. DBMS1 109 comprises a DB application 111 and a query optimizer 110. The DB application 111 may be configured for processing data stored in storage device 107. The query optimizer 110 may be configured for generating or defining query plans for executing queries e.g. on source database 112. The source database 112 may for example comprise a source table 190. An example content of the source table 190 is shown in FIG. 2.

Second computer system 121 includes processor 122, memory 123, I/O circuitry 124 and network interface 125 coupled together by bus 126.

Processor 122 may represent one or more processors (e.g. microprocessors). The memory 123 can include any one or combination of a volatile memory element (e.g., random access memory (RAM)), nonvolatile memory element (e.g., ROM), erasable programmable read only memory (EPROM), electronically erasable programmable read only memory (EEPROM), and programmable read only memory (PROM). Note that the memory 123 can have a distributed architecture, where various components are situated remote from one another, but can be accessed by the processor 122.

Memory 123 in combination with persistent storage device 127 may be used for local data and instruction storage. Storage device 127 includes one or more persistent storage devices and media controlled by I/O circuitry 104. Storage device 127 may include magnetic, optical, magneto optical, or solid-state apparatus for digital data storage, for example, having fixed or removable media. Sample devices include hard disk drives, optical disk drives and floppy disks drives. Sample media include hard disk platters, CD-ROMs, DVD-ROMs, BD-ROMs, floppy disks, and the like.

Memory 123 may include one or more separate programs e.g. database management system DBMS2 129, each of which comprises an ordered listing of executable instructions for implementing logical functions, notably functions involved in embodiments of this invention. The software in memory 123 shall also typically include a suitable OS 128. The OS 128 essentially controls the execution of other computer programs for implementing at least part of methods as described herein. DBMS2 129 comprises a DB application 131 and a query optimizer 130. The DB application 131 may be configured for processing data stored in storage device 127. The query optimizer 130 may be configured for generating or defining query plans for executing queries e.g. on a target database 132.

First computer system 101 and second computer system 121 may be independent computer hardware platforms communicating through a high-speed connection 142 or a network 141 via network interfaces 105, 125. The network 141 may for example comprise a local area network (LAN), a general wide area network (WAN), and/or a public network (e.g., the Internet). Every computer system 101 and 121 is responsible for managing its own copies of the data.

Although shown in FIG. 1 as separate systems, the first and second computer systems may belong to a single system e.g. sharing a same memory and processor hardware, while each of the first and second computer systems is associated with a respective DBMS and datasets e.g. the two DBMSs may be stored in the shared memory. In another example, the two database management systems DBMS1 and DBMS2 may form part of a single DBMS that enables communications and methods performed by DBMS1 109 and DBMS2 119 as described herein. The first and second datasets may be stored on a same storage or on separate storages.

The storages 107 and 127 may comprise extents. The term "extent" may refer to a storage unit (e.g. a contiguous area of storage) for storing the data of the data table 190. The records of the data table 190 may be stored in one or more extents. FIG. 2 describes an example of how the records can be stored in the extents.

A database engine (not shown) may be configured to perform data migration or data transfer in accordance with the present disclosure. The database engine may be part of the first computer system 101 and/or second computer system 121 (e.g. the database engine may for example comprise at least part of the DBMS1 109 and/or DBMS2 119). In another example, the database engine may be or may comprise a separate computer system that is configured to connect to the data processing system 100, wherein the database engine may be configured to control the data processing system 100 to perform at least part of the present method.

The transfer of data between the source database 112 and the target database 132 may be performed using one or more threads. Two pipes may, for example, be provided as predefined memory areas of memories 103 and 123 respectively. One first pipe of the memory 103 may be used for the reading step such that an output from the reading step is placed in the pipe and one second pipe of memory 123 may be used for writing after transferring the data via the network. The transfer process of data records from the source database 112 to the target database 132 may for example comprise a read process for reading the records of the source database 112. The read data records are stored in the first pipe. The data records are then transferred over network 141 by the one or more threads. At the computer system 121, the received data records are stored in the second pipe before being processed by a write process. The read process may for example be performed by a reading application of the DBMS1 109 (the reading application may be, in another example, a separate component of DBMS1 109) and the write process may be performed by a retriever. The retriever may retrieve data records of the second pipe for storing them in the target database 132. The retriever may for example be part of DBMS2 119. In another example, the retriever may be a dedicated program embedding JDBC or ODBC connector which is responsible for reading to the data coming from the second pipe on the target side.

FIG. 2 shows an example content of the source data table 190. The source data table 190 may comprise two attributes or columns C1 and C2. The column C1 has character values A, B, C and D and C2 has values 1, 2, 3 and 4. The source data table 190 may be ordered using the values of the two columns C1 and C2. FIG. 2 indicates the difference between a simple ordering and CBT ordering. The result of the simple ordering is shown in the source data table 201, where the simple ordering may be based on alphabetical order in combination with numerical order. The source table 201 after performing the simple ordering has records annotated A1-A4, B1-B4, C1-C4 and D0-D4 (collectively referred to as A1-D4) which are ordered using columns C1 and C2. For example, A1 is a concatenation of the values of the two columns C1 and C2 to indicate that the record A1 is a record having a value of C1 which is 'A' and value of C2 which is '1'. The source table 290 has records A1-D4 which are ordered, using columns C1 and C2, in accordance with the CBT order which is obtained after applying a re-arrangement of the data table using the Hilbert Filling Curve algorithm. The re-arrangement process may for example be performed during tasks like grooming tasks. FIG. 2 further illustrates on which extent of the storage 107 the records of the source table 290 as well as the source table 201 are stored. The records of the source data table 290 are ordered using the Hilbert Filling Curve algorithm in order to enable the concept of the clustered base tables (CBT) which is introduced to minimize table scan in extents for databases by clustering the ordered records in same or nearby extents. The CBT order 299 is indicated in FIG. 2, where each record of the records A1-D4 is associated with the respective CBT order. For example, record A1 is associated with CBT order 0 which indicates the first order, while record D2 is associated with CBT order 6 which indicates the seventh order. This may enable that the records of the source data table 190 may be arranged basing on defined keys (columns) in the same or nearby extents. This may benefit for queries with CBT columns used in WHERE conditions or join statements. The middle box 203 illustrates how the Hilbert curve covers the set of the data (e.g. with a 2-dimensional key). Each square inside box 203 represents a row or record having a value of C1 and C2.

Figure 3A:
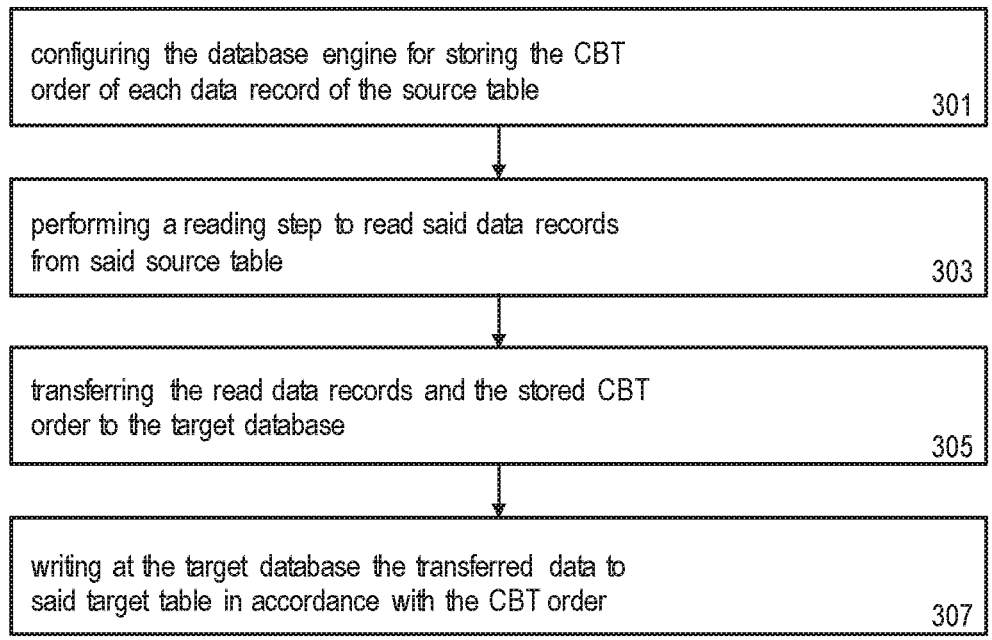
FIG. 3A is a flowchart of a method using a database engine for migrating data records from a source database to a target database.

After the migration of the data table 190 to the target database 132, especially when the data are moved in more than one thread, the CBT order may be changed by the way the threads reach the target database 132. For example, using four threads to transfer the records of the four extents EXT 0-3 of the source data table 190 may result in one thread arriving before the other threads (e.g. leading to the fact that the records of the EXT 2 of the source database are stored in EXT 1 of the target database 131 and that the records of the EXT 1 of the source database are stored in EXT 2 of the target database 131). This may not make use of the CBT order at the target database. FIG. 3A provides a method that may solve this problem.

FIG. 3A is a flowchart of a method using a database engine (e.g. database engine of the data processing system 100) for migrating data records A1-D4 from source data table 290 of a source database 112 to a target table of target database 132. As described in FIG. 2, the data records A1-D4 of the source data table 290 are arranged in or sorted in accordance with the CBT order following the Hilbert-Filling-Curve algorithm. For example, at least part of the method steps performed on the source database 112 may be performed by DBMS1 and at least part of the method steps performed on the target database 132 may be performed by DBMS2 e.g. by the retriever of DBMS2. In case of a separate database engine, the execution of the method steps may, for example, be controlled or triggered by the database engine e.g. the database engine may be configured to control the data processing system 100 to perform the method steps e.g. via control commands.

In step 301, the database engine, e.g. DBMS1 109, may be configured for storing the CBT order 299 of each data record A1-D4 of the source table 290 in a reference table of said source table 290 or in a column of said source table 290.

Figure 3B:
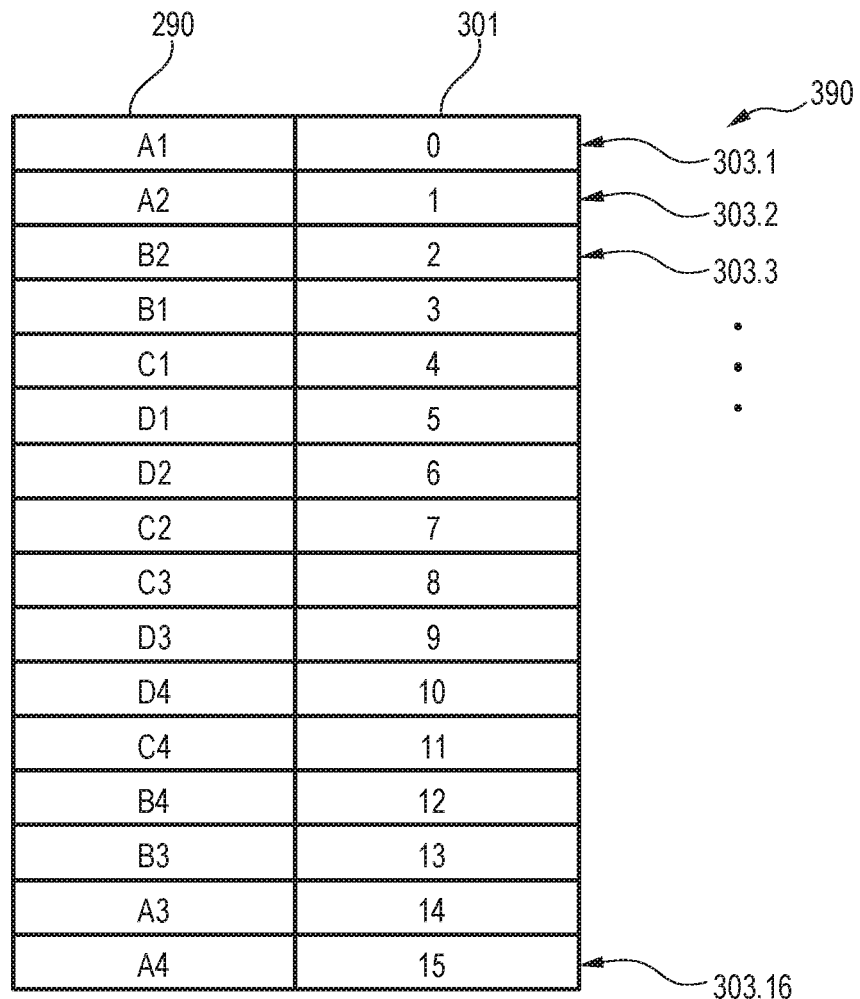
FIG. 3B depicts a structure of the source data table in accordance with the present disclosure.

For example, as shown in FIG. 3B a column 301 may be added to the source table 290 to obtain source table 390. The values of the CBT order 299 may be stored in the added column 301 so that each record 303.1-16 comprises in addition to records A1-D4, the CBT order 299 associated with records A1-D4. For example, record 303.1 of the source table 390 comprises values of record A1 in addition to the CBT order 0. The column 301 may be a hidden column. The hidden column may be a column that is not displayed (or is not displayable) with other columns of the source table 390 when displaying the source table 390.

In another example, the reference table may be used to store the CBT order 299. The source and/or reference tables may be configured such that the reference table may be used to determine the CBT order of each record of the source table 290.

In step 303, a reading step may be performed in order to read the data records 303.1-16 from said source table 390, wherein in said reading step said stored CBT order is used. For example, the records 303.1-16 are read following the CBT order 299 e.g. record 303.1 is first read followed by record 303.2 and so on. The CBT order may be read from the additional column 301 or from the additional reference table. A reading application (e.g. of DBMS1) may perform the reading step and may store the read data in a first pipe of system 101 (e.g. the first pipe may be an area of memory 103). The thread used for transferring data may be configured to read the data from the first pipe for transferring it over the network.

In step 305, the read data records including the stored CBT order may be transferred to the target database 132 in accordance with the stored CBT order 299. For example, if a single thread is used to transfer the records A1-D4, the following SQL instructions may be used for reading the records A1-D4 based on the CBT order in order to be transferred.

In case a column (named 'orderHFC') is added to the source table 290 (named 'T_CBT') the following SQL instructions may be used: select T_CBT .*, orderHFC from T_CBT order by orderHFC.

In case of the additional reference table (named 'ref') of the source table 290, the following SQL instructions may be used: select cbt.*, ref.orderHFC from T_CBT cbt inner join T_REF_CBT ref on cbt.rowID=ref.fk_RowID order by ref.orderHFC.

Figure 4:
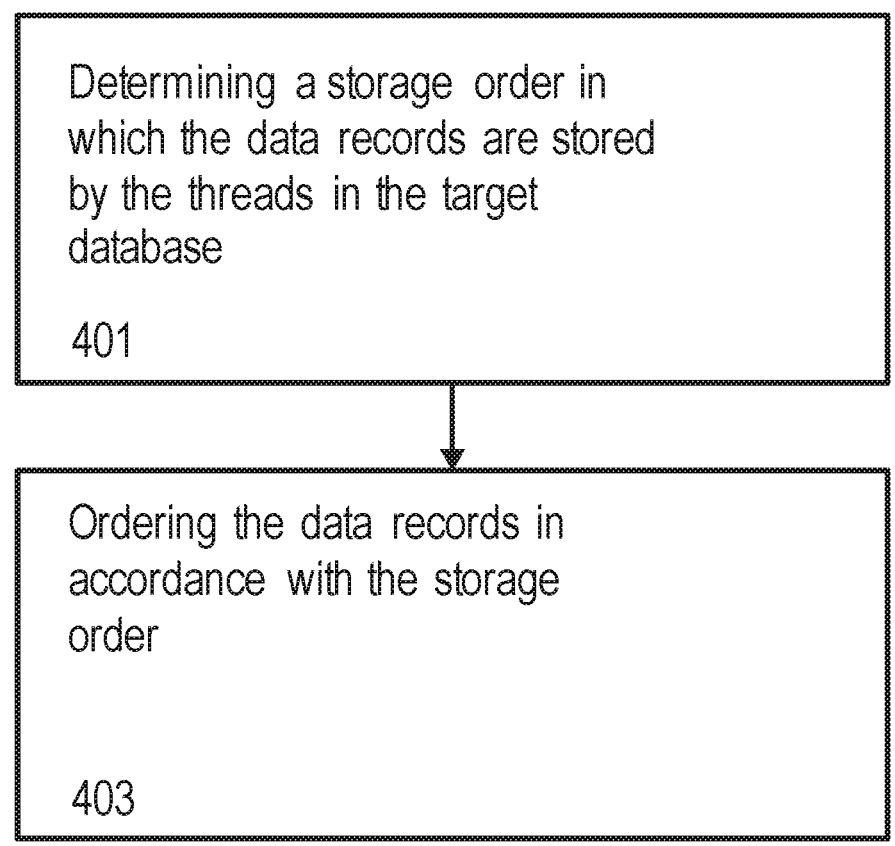
FIG. 4 is a flowchart of a method for transferring and writing data records using the source table.

FIGS. 4 and 5 describe another example for transferring and writing the data in accordance with the present disclosure.

In step 307, the transferred data may be written to the target table of the target database 132 in accordance with the CBT order using the stored CBT order e.g. for each record A1-D4 to be copied in the target data table, the corresponding CBT order or value in column 301 may be read and based on that read CBT order, the record may be stored accordingly in the target data table. Using the stored CBT order for storing data may be advantageous in particular as the transferred records may not reach the target database 132 in the CBT order e.g. record D2 may reach the target database 132 before record C1. The resulting data table (after storing all records A1-D4) may for example be the source table 290. The writing of the transferred data may, for example, be performed by the retriever. The transferred data may for example be placed by the thread in a second pipe of the system 121 (e.g. the second pipe may be part of memory 123) and the retriever may read the data from the second pipe for performing the writing. The writing may be performed either directly after reading data of the second pipe to the target table or via the buffer as described below in FIGS. 5A-D. The data read from the second pipe are buffered before being written into the target table. The first and/or second pipes may optionally be used with the present method.

FIG. 4 is a flowchart of a method for transferring and writing the data records A1-D4 using the source table 390. For example, threads may be used to transfer respective records of the records A1-D4.

In step 401, a storage order in which the data records A1-D4 are stored by the threads in the target database may be determined. For example, without the present method, the transfer and writing of the data records A1-D4 may result in data records A-D4 being stored in the target database following an order that is not the same as the CBT order 299 e.g. as described above with FIG. 2.

In case the storage order is different from the CBT order, an operation may be applied in step 403 (e.g. at the reading step 303) to order the data records A1-D4 in accordance with the storage order before transferring and writing the data records A1-D4 to the target database. The ordering is performed such that the writing of the data records can be performed in accordance with the CBT order. For example, as shown with the code of FIG. 4, a modulo operation may be performed in order to change the CBT order to the storage order.

For example, assuming that two threads are provided, wherein each thread is configured to transfer a single set of four records. E.g. each of the threads may be configured to transfer the set of records of a given extent, EXT 0-3. For example, thread 1 may be used to transfer records 303.1-303.4 of extent EXT 0, thread 2 may be used to transfer records 303.5-303.8 of extent EXT 1 (after transferring the records of extents EXT 0 and EXT 1, the threads may be used to transfer the remaining records of the extents EXT 2 and EXT 3 in the same way). It may happen e.g. due to the network connections, that records 303.5-303.6 (comprising C1 and D1) of the second thread 2 arrive at the target database 132 before the records 303.3-303.4 (comprising B2 and B1) of the thread 1 and thus may be stored in that order e.g. A1 followed by A2 followed by C1 and D1. However, this order is different from the CBT order. Using the method of FIG. 4 e.g. via a modulo operation, this different order may be taken into account when assigning records to the two threads in order that the records reach the target database and thus be stored in the CBT order. Following the above example, thread 1 may be assigned records A1-A2-C1-D1 and the second thread 2 may be assigned records B2-B1-D2-C2. In this way, the records B2-B1 of the second thread would arrive at the target database before the records C1-D1 of the first thread and may thus be stored after A1-A2 i.e. in this order A1-A2-B2-B1 which is the CBT order.

The following SQL instructions may be used to perform the modulo operation described above for reordering the records before being transferred for a) the case of an additional column 301 and for b) the case of an additional reference table:

```
a) select T_CBT .*, orderHFC from T_CBT
     where mod( ( orderHFC − mod( orderHFC , optimalRow4Chunk ) )
       / optimalRow4Chunk,
       maxThreadNO ) = currentThread
     order by orderHFC
b) select cbt.*, ref.orderHFC from T_CBT cbt
   [inner join T_REF_CBT ref on cbt.rowID = ref.fk_RowID]
     where mod(
       (ref.orderHFC − mod ( ref.orderHFC , optimalRow4Chunk ) )
       / optimalRow4Chunk,
       maxThreadNO ) = currentThread
     order by ref.orderHFC
```

Where optimalRow4Chunk is an optimal number of records in a single chunk. The value may be set as a compromise between an optimal time for reading/transferring and buffering/sorting, and may additionally be related to the size of buffer memory dedicated for the retriever. maxThreadNO is the number of threads in which transfer is realized and currentThread is the current transfer thread.

FIGS. 5A-D depict diagrams illustrating a method for transferring and writing records A1-D4 of the source table 390 into the target database 132. Two threads are used in the example of FIGS. 5A-D.

Figure 5A:
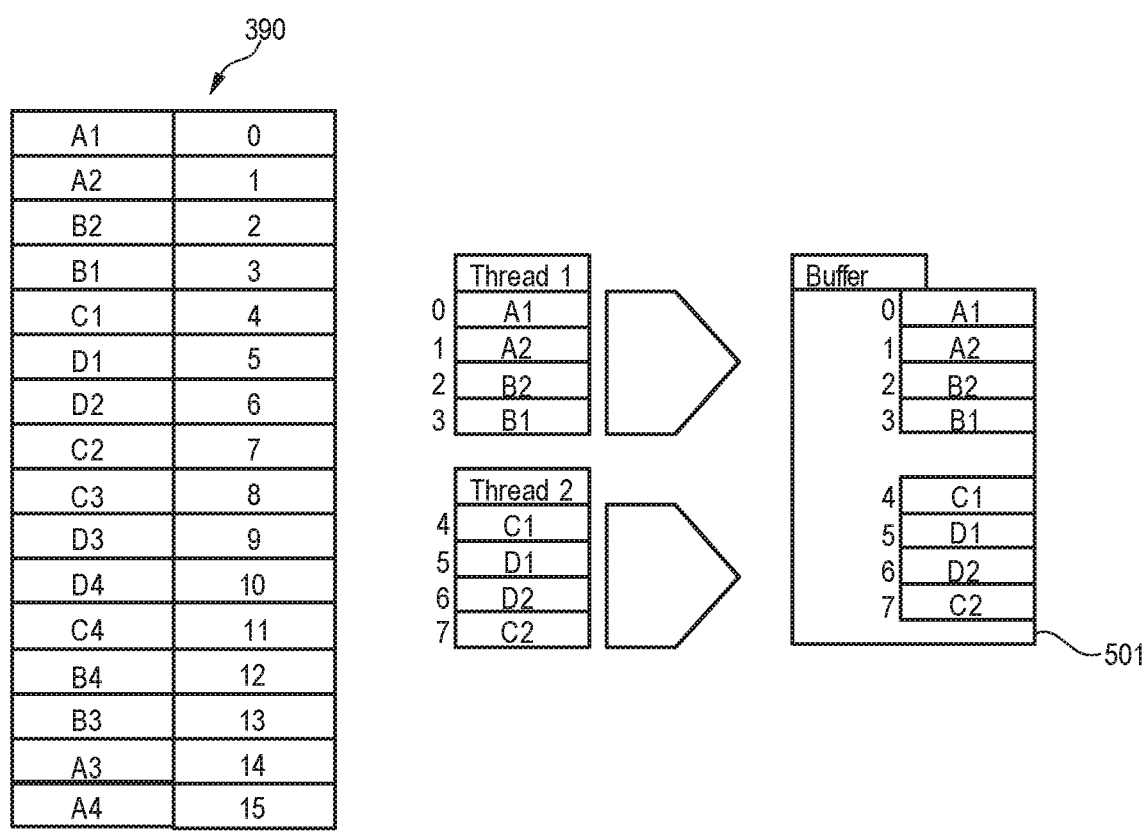
FIGS. 5A-D depict diagrams illustrating a method for transferring and writing records of the source table into the target database.

In a first step as illustrated in FIG. 5A, the two successive sets of records, namely (A1, A2, B2, B1) and (C1, D1, D2, C2) of the extents EXT 0 and EXT 1 are assigned to the threads thread 1 and thread 2 respectively.

The records of each of the two sets are buffered in a buffer 501 that is used by the retriever for buffering data records before storing them in the target database 132. The records are buffered in association with their CBT order. Since the two sets of records are successive and are the first ordered sets of the source table 390, they may be stored, after they are buffered, following the CBT order in the target data table. The retriever may be configured to store (e.g. in the buffer 501) an indication of the CBT order of the previously stored records (e.g. the retriever may store the CBT order 7, which is the order of the last ordered and stored record, as an indication of the CBT order of the stored two sets of records (A1, A2, B2, B1) and (C1, D1, D2, C2).

Figure 5B:
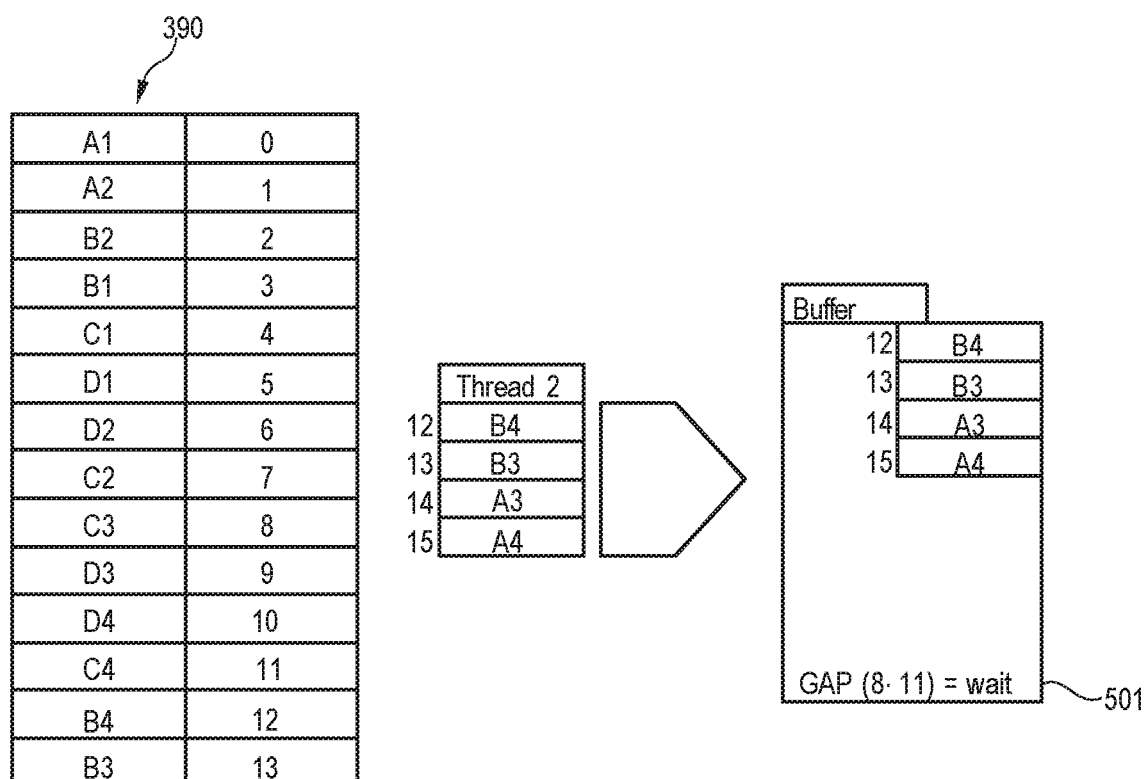

Each thread that completed the task of the transfer of records may be used again to transfer the remaining records. As shown in FIG. 5B, thread 2 is used to transfer the set of records of the extent EXT 3. Thread 1 is not used yet for the transfer of the remaining records. For example, this is due to the fact that thread 1 was suspended (e.g. due to a network issue) and only thread 2 transfers the data.

Figure 5C:
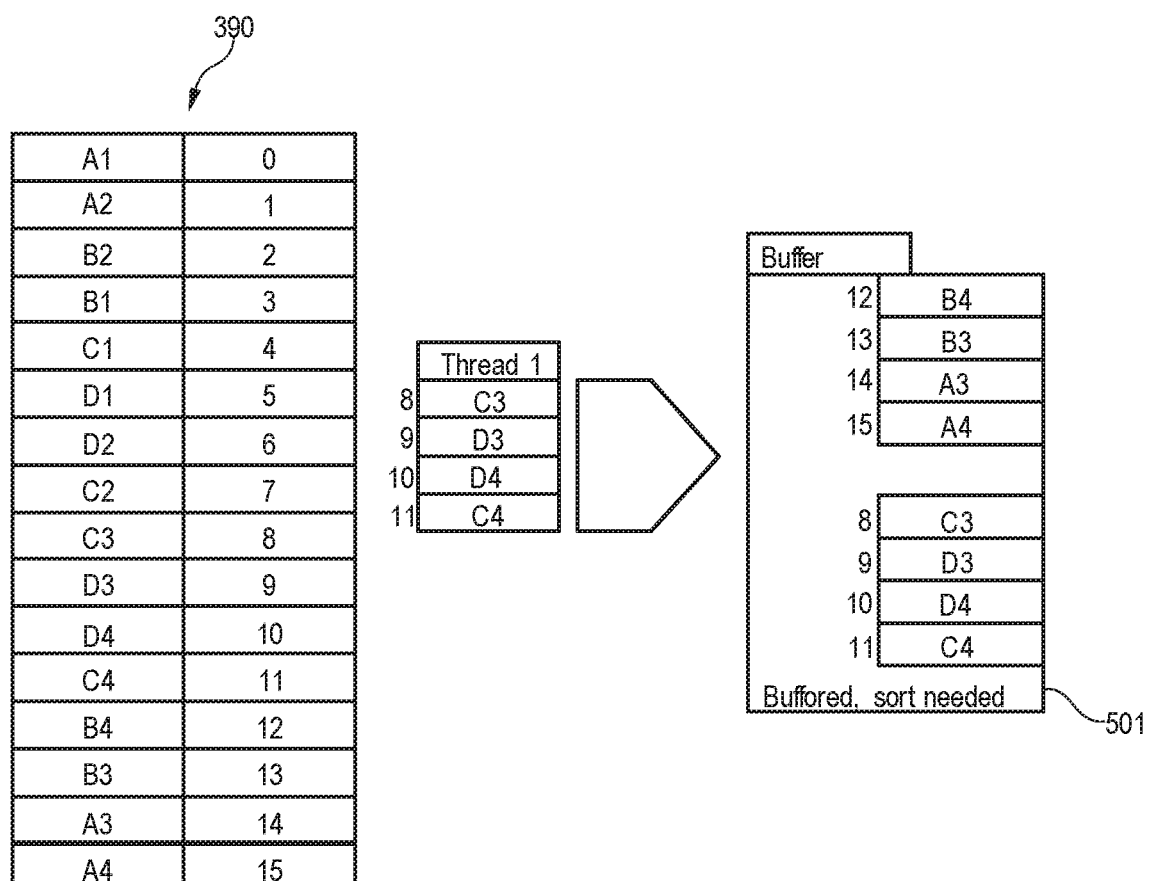
Figure 5D:
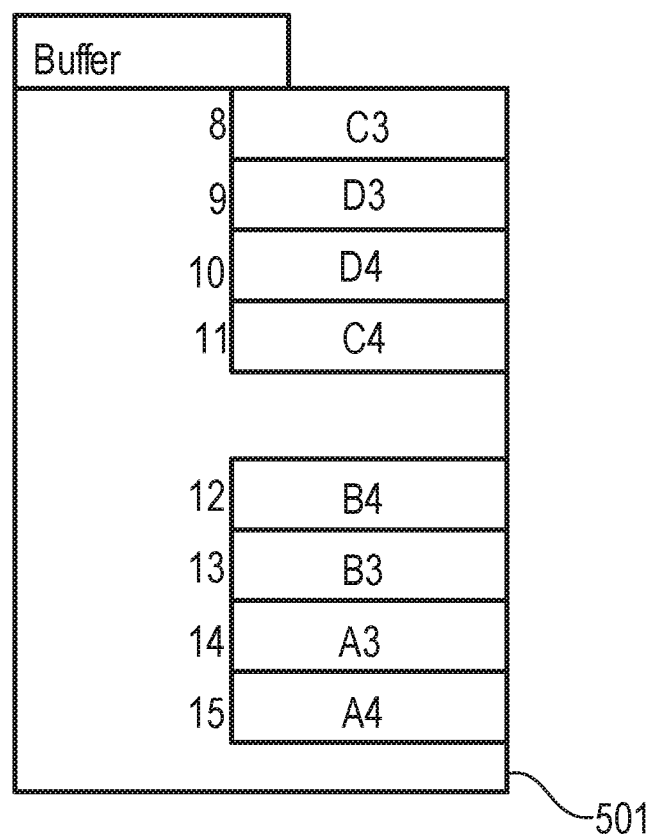

In this case of FIG. 5B, the set of records (B4, B3, A3, A4) is buffered in the buffer 501. However, using the stored order indication, the retriever may be configured to determine that there is a gap (8-11) in the CBT orders that are processed when receiving the set of records (B4, B3, A3, A4). Since this set of records is not (immediately) subsequent to the two previously stored sets of records (A1, A2, B2, B1) and (C1, D1, D2, C2), the retriever may wait until the set of records (C3, D3, D4, C4) is stored in the buffer 501. This is for example indicated in FIG. 5C, where thread 1 is restarted for transferring the data. As shown in FIG. 5C, thread 1 transfers the set of records (C3, D3, D4, C4) which is then stored in the buffer after the set of records (B4, B3, A3, A4). However, there is a need to resort the buffered records of the buffer because their order is different from the CBT order. Thus, as indicated in FIG. 5D, the two sets of records (B4, B3, A3, A4) and (C3, D3, D4, C4) are ordered in accordance with the CBT order. Since the two sets of records that are currently in the buffer 501 of FIG. 5D are immediately following or subsequent of the previously stored sets of records (A1, A2, B2, B1) and (C1, D1, D2, C2) they may be stored in the target data table.

In another example, a method using a database engine for migrating data from a first database is provided, where said data is arranged in a sorted source table having a column-based sort order, to a second database, where said data is arranged in a sorted target table having a clustered-base-table order following the Hilbert-Filling-Curve algorithm. The method comprises the steps: introducing into said database engine a functionality of storing the order obtained from calculating said clustered-base-table order following the Hilbert-Filling-Curve algorithm, by adding a reference table or a hidden column to said source table, performing a reading step to read said data from said source table, wherein in said reading step said stored order is used, applying a modulo operation to ensure that said data maintained in relative proximity, passing the result of said reading step to a pipe, retrieving said data in a retrieving step using a dedicated pipe on the side of said target table, buffering and synchronizing said data for writing it to said target table.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method using a database engine for migrating data records from a source database to a target database, wherein said data records are arranged in a sorted source table of the source database in accordance with a clustered-base-table order ("CBT order") following the Hilbert-Filling-Curve algorithm, the method comprising:
    configuring the database engine for storing the CBT order of each data record of the source table in a reference table to said source table or a in a column of said source table;
    performing a reading step to read said data records from said source table, wherein in said reading step said stored CBT order is used;
    transferring the read data records and the stored CBT order to the target database in accordance with the stored CBT order; and
    writing at the target database the transferred data to said target table in accordance with the CBT order using the stored CBT order.

2. The method of claim 1, wherein transferring the data records is performed using one or more threads.

3. The method of claim 2, further comprising:
splitting the data records into chunks of consecutive subsets of ordered data records, wherein each thread is configured to transfer a respective subset of the data records.

4. The method of claim 2, further comprising:
determining a storage order in which the data records are stored by the threads in the target database, wherein the reading step further comprises in case the storage order is different from the CBT order applying an operation to order the data records in accordance with the storage order such that the writing of the data records can be performed in accordance with the CBT order.

5. The method of claim 4, wherein applying the operation to order the data records comprises applying a modulo operation to perform the ordering of the data records.

6. The method of claim 1, further comprising:
providing a first pipe and second pipe, wherein the result of said reading step is placed in the first pipe, wherein the second pipe is configured for storing said data records after being transferred to a system of the target database; and
buffering and synchronizing said data for the writing.

7. The method of claim 6, wherein the buffering and synchronizing comprises:
buffering in a buffer a current received subset of records of a given thread; and
in response to determining that the data records of the current received subset are the first ordered data records of the source table:
storing the first subset and any subsequent stored subset of records in the buffer.

8. The method of claim 1, wherein the storing of the CBT order comprises:
storing the CBT order in a hidden column.

9. A computer program product for using a database engine for migrating data records from a source database to a target database, wherein said data records are arranged in a sorted source table of the source database in accordance with a clustered-base-table order ("CBT order") following the Hilbert-Filling-Curve algorithm, the computer program product comprising:
one or more computer-readable storage devices and program instructions stored on at least one of the one or more computer-readable storage devices for execution by at least one or more computer processors of a computer system, the program instructions, when executed by the at least one of the one or more computer processors, causing the computer system to perform a method comprising:
configuring the database engine for storing the CBT order of each data record of the source table in a reference table to said source table or a in a column of said source table;
performing a reading step to read said data records from said source table, wherein in said reading step said stored CBT order is used;
transferring the read data records and the stored CBT order to the target database in accordance with the stored CBT order; and
writing at the target database the transferred data to said target table in accordance with the CBT order using the stored CBT order.

10. The computer program product of claim 9, wherein transferring the data records is performed using one or more threads.

11. The computer program product of claim 10, further comprising:
splitting the data records into chunks of consecutive subsets of ordered data records, wherein each thread is configured to transfer a respective subset of the data records.

12. The computer program product of claim 10, further comprising:
determining a storage order in which the data records are stored by the threads in the target database, wherein the reading step further comprises in case the storage order is different from the CBT order applying an operation to order the data records in accordance with the storage order such that the writing of the data records can be performed in accordance with the CBT order.

13. The computer program product of claim 12, wherein applying the operation to order the data records comprises applying a modulo operation to perform the ordering of the data records.

14. The computer program product of claim 9, further comprising:
providing a first pipe and second pipe, wherein the result of said reading step is placed in the first pipe, wherein the second pipe is configured for storing said data records after being transferred to a system of the target database; and
buffering and synchronizing said data for the writing.

15. A computer system for using a database engine for migrating data records from a source database to a target database, wherein said data records are arranged in a sorted source table of the source database in accordance with a clustered-base-table order ("CBT order") following the Hilbert-Filling-Curve algorithm, the computer system comprising:
one or more computer processors, one or more computer-readable storage media, and program instructions stored on one or more of the computer-readable storage media for execution by at least one of the one or more computer processors, the program instructions, when executed by the at least one of the one or more computer processors, causing the computer system to perform a method comprising:
configuring the database engine for storing the CBT order of each data record of the source table in a reference table to said source table or a in a column of said source table;
performing a reading step to read said data records from said source table, wherein in said reading step said stored CBT order is used;
transferring the read data records and the stored CBT order to the target database in accordance with the stored CBT order; and
writing at the target database the transferred data to said target table in accordance with the CBT order using the stored CBT order.

16. The computer system of claim 15, wherein transferring the data records is performed using one or more threads.

17. The computer system of claim 16, further comprising:
splitting the data records into chunks of consecutive subsets of ordered data records, wherein each thread is configured to transfer a respective subset of the data records.

18. The computer system of claim 16, further comprising:
determining a storage order in which the data records are stored by the threads in the target database, wherein the reading step further comprises in case the storage order is different from the CBT order applying an operation to order the data records in accordance with the storage order such that the writing of the data records can be performed in accordance with the CBT order.

19. The computer system of claim 18, wherein applying the operation to order the data records comprises applying a modulo operation to perform the ordering of the data records.

20. The computer system of claim 15, further comprising:
providing a first pipe and second pipe, wherein the result of said reading step is placed in the first pipe, wherein the second pipe is configured for storing said data records after being transferred to a system of the target database; and
buffering and synchronizing said data for the writing.

* * * * *